(12) United States Patent
Tachibana et al.

(10) Patent No.: US 12,466,486 B2
(45) Date of Patent: Nov. 11, 2025

(54) FRONT VEHICLE-BODY STRUCTURE OF VEHICLE

(71) Applicant: MAZDA MOTOR CORPORATION, Hiroshima (JP)

(72) Inventors: Kenta Tachibana, Hiroshima (JP); Takashi Narahara, Hiroshima (JP); Yasushi Ishikawa, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 408 days.

(21) Appl. No.: 18/173,131

(22) Filed: Feb. 23, 2023

(65) Prior Publication Data
US 2024/0067269 A1  Feb. 29, 2024

(30) Foreign Application Priority Data
Aug. 25, 2022 (JP) .................. 2022-134291

(51) Int. Cl.
*B62D 21/15* (2006.01)
*B62D 21/11* (2006.01)
*B62D 25/08* (2006.01)

(52) U.S. Cl.
CPC ............ *B62D 21/152* (2013.01); *B62D 21/11* (2013.01); *B62D 25/08* (2013.01)

(58) Field of Classification Search
CPC .... B62D 25/08; B62D 25/082; B62D 25/085; B62D 21/11; B62D 21/152

USPC ........... 296/203.01, 2, 29, 30, 187.09, 187.1
See application file for complete search history.

(56) References Cited

U.S. PATENT DOCUMENTS

2011/0095568 A1* 4/2011 Terada ................. B62D 25/088
                                                  296/187.09
2019/0016389 A1  1/2019 Kamei et al.

FOREIGN PATENT DOCUMENTS

JP          2019-018666 A    2/2019

* cited by examiner

*Primary Examiner* — Dennis H Pedder
(74) *Attorney, Agent, or Firm* — Studebaker Brackett PLLC

(57) ABSTRACT

A front side frame has a first deformation promotion portion to bend and deform a front side frame inwardly in a case where a collision load is applied to a vehicle from a vehicle front side, a front vehicle-body structure further comprises a load transmission portion positioned in front of a suspension housing between the front side frame and an apron reinforcement so as to transmit the collision load to the suspension housing, the load transmission portion being provided to connect the front side frame and the apron reinforcement so as to transmit a tensional load applied in a vehicle width direction between the front side frame and the apron reinforcement, and the load transmission portion has a second deformation promotion portion positioned in the vicinity of the first deformation promotion portion and promoting the bending/deforming of the front side frame.

7 Claims, 9 Drawing Sheets

FRONT VEHICLE-BODY STRUCTURE OF VEHICLE

BACKGROUND OF THE INVENTION

The present invention relates to a front vehicle-body structure of a vehicle.

Japanese Patent Laid-Open Publication No. 2019-18666 (US2019/0016389 A1) discloses a font vehicle-body structure of a vehicle. This front vehicle-body structure comprises a front side frame. This front side frame extends in a vehicle longitudinal direction in front of a dash panel. The front side frame has a bending-deformation promotion portion. This bending-deformation promotion portion bends and deforms the front side frame in a case where a collision load is applied to the front side frame from a vehicle front side. The front side frame is bent (deformed) in a vehicle width direction at its bending-deformation promotion portion in a vehicle frontal collision (hereafter, this will be referred to as "collision" simply in some cases), thereby absorbing collision energy.

Herein, an apron reinforcement which extends in the vehicle longitudinal direction is positioned above and on an outward side, in the vehicle width direction, of the front side frame. The apron reinforcement hits against a collision object in the collision, so that the apron reinforcement can contribute to the energy absorption together with the front side frame.

In an electromotive vehicle, for example, there is a case where a battery for vehicle traveling is provided below a vehicle floor. Further, there is a case where the apron reinforcement of this electromotive vehicle is positioned above an apron reinforcement of a vehicle with no battery. Herein, the electromotive vehicle includes a BEV (Battery Electric Vehicle), a PHEV (Plug-in Hybrid Vehicle) and the like, and the above-described vehicle with no battery means a vehicle in which the battery is not provided below the vehicle floor.

In a vehicle in which the apron reinforcement is located at a relatively high level, there is a concern that the apron reinforcement may be positioned above the collision object, so that the apron reinforcement may not hit against the collision object in the collision. That is, there is a concern that the apron reinforcement may not contribute to the energy absorption properly. Accordingly, any other energy-absorption structure, in place of the apron reinforcement, may be required for the vehicle with the apron reinforcement located at the relatively high level. However, simply adding the other energy-absorption structure may cause the vehicle weight improperly. Thus, any other useful energy-absorption structure without increasing the vehicle weight becomes necessary. Herein, the vehicle with the apron reinforcement located at the relatively high level is not limited to the electromotive vehicle. There is a case where even the vehicle with no battery has an apron reinforcement which is located at the high level.

SUMMARY OF THE INVENTION

The present invention has been devised in view of the above-described matter, and an object of the present invention is to provide a front vehicle-body structure of a vehicle which can properly make the apron reinforcement located at the high level contribute to the energy absorption in the collision.

The front vehicle-body structure of the vehicle according to a first aspect of the present invention comprises a front side frame extending in a vehicle longitudinal direction in front of a dash panel, an apron reinforcement positioned above and on an outward side, in a vehicle width direction, of the front side frame and extending in the vehicle longitudinal direction, and a suspension housing positioned between the front side frame and the apron reinforcement and fixed to both of the front side frame and the apron reinforcement, wherein the front side frame has a first deformation promotion portion to bend and deform the front side frame inwardly, in the vehicle width direction, in a case where a collision load is applied to the vehicle from a vehicle front side, the front vehicle-body structure further comprises a load transmission portion positioned in front of the suspension housing between the front side frame and the apron reinforcement so as to transmit the collision load to the suspension housing, the load transmission portion being provided to connect the front side frame and the apron reinforcement so as to transmit a tensional load applied in the vehicle width direction between the front side frame and the apron reinforcement, and the load transmission portion has a second deformation promotion portion which is positioned in the vicinity of the first deformation promotion portion and promote the bending/deforming of the front side frame.

According to the above-described first aspect of the present invention, the front side frame has the first deformation promotion portion. This first deformation promotion portion deforms the front side frame inwardly, in the vehicle width direction, in the case where the collision load is applied to the vehicle from the vehicle front side. The deformed front side frame absorbs the energy.

Herein, the apron reinforcement is positioned above and on the outward side, in the vehicle width direction, of the above-described front side frame. This apron reinforcement extends in the vehicle longitudinal direction. Between the front side frame and the apron reinforcement is positioned the suspension housing. This suspension housing is fixed to both of the front side frame and the apron reinforcement.

The load transmission portion is positioned in front of the suspension housing. This load transmission portion connects the front side frame and the apron reinforcement which are arranged mostly in parallel. The load transmission portion further transmits the tensional load in the vehicle width direction between the front side fame and the apron reinforcement. The load transmission portion draws the apron reinforcement inwardly, in the vehicle width direction, and downwardly when the front side frame is deformed inwardly, in the vehicle width direction, as described above. The apron reinforcement is deformed such that it moves inwardly, in the vehicle width direction, and downwardly. Since the level of the apron reinforcement which is originally positioned above the front side frame becomes lower, the apron reinforcement comes to hit against the collision object. Thereby, the apron reinforcement can properly contribute to the energy absorption in the collision.

That is, even if the level of the apron reinforcement is high because of the structure of the electromotive vehicle, for example, the apron reinforcement can contribute to the energy absorption in the collision of the vehicle. In the present front vehicle-body structure, since the apron reinforcement is made to contribute to the energy absorption by utilizing the deformation of the front side frame, any other structure for the energy absorption, in place of the apron reinforcement, is unnecessary. Thus, the present front vehicle-body structure is useful in reducing the vehicle weight.

Further, while the load transmission portion is connected to the front side frame, the second deformation promotion portion promotes the deformation of the front side frame. Since the second deformation promotion portion does not hinder the deformation of the front side frame, moving of the apron reinforcement is not hindered. Both of the front side frame and the apron reinforcement can contribute to the energy absorption in the collision of the vehicle.

Herein, the load transmission portion not only transmits the tensional load from the front side frame to the apron reinforcement but also transmits the collision load to the suspension housing when the collision load is applied to the vehicle. The suspension housing having the high rigidity receives the collision load. It is suppressed that the load transmission portion is deformed and/or broken by the collision load because the load transmission portion transmits the collision load. The load transmission portion without being deformed and/or broken can transmit the tensional load from the front side frame to the apron reinforcement in the collision.

In an embodiment of the above-described present invention, the second deformation promotion portion includes a first fixation portion which is fixed to the front side frame in front of the first deformation promotion portion, a second fixation portion which is fixed to the front side frame in back of the first deformation promotion portion, and a non-fixation portion which is positioned between the first fixation portion and the second fixation portion and not fixed to the front side frame.

The above-described load transmission load is fixed to respective positions of the front side frame which are located in front of and in back of the first deformation promotion portion, respectively, but not fixed to a position of the front side frame which corresponds to the first deformation promotion portion. Since the non-fixation portion does not restrict the front side frame at the position of the first deformation promotion portion, the bending/deforming of the front side frame is not hindered. Combination of the first deformation promotion portion and the second deformation promotion portion can promote the bending/deforming of the front side frame.

In another embodiment of the above-described present invention, the load transmission portion has a first joint portion which is joined to a flange of the front side frame, and the non-fixation portion is a first notch which is formed at the first joint portion.

The above-described first notch is not joined to the flange of the front side frame. This first notch can promote the bending/deforming of the front side frame.

Herein, the second deformation promotion portion of the load transmission portion is not limited to the above-described non-fixation portion (or the first notch). The second deformation promotion portion may be a fragile portion which is formed at the load transmission portion. This fragile portion deforms the load transmission portion according to the bending/deforming of the front side frame. The fragile portion does not hinder the bending/deforming of the front side frame.

In another embodiment of the above-described present invention, the load transmission portion has an upper-side plate and a lower-side plate which is positioned below the upper-side plate.

The load transmission portion made of the upper-and-lower two sheets of plates has the high rigidity. The load transmission portion having the high rigidity can efficiently transmit the tensional load applied in the vehicle width direction between the front side frame and the apron reinforcement. Further, the load transmission portion having the high rigidity can transmit the collision load to the suspension housing.

In another embodiment of the above-described present invention, the upper-side plate and the lower-side plate are joined together, and the load transmission portion has a closed-cross section structure in which a closed-cross section extending in the vehicle longitudinal direction is formed between the upper-side plate and the lower-side plate.

In an initial stage of application of the collision load to the load transmission portion, the load transmission portion can absorb the energy by its closed-cross section being crushed. The load transmission portion having the closed-cross section structure can contribute to both of the energy absorption and the load transmission.

In another embodiment of the above-described present invention, the apron reinforcement has a third deformation promotion portion to bend and deform the apron reinforcement inwardly, in the vehicle width direction, in front of the suspension housing, and the load transmission portion has a fourth deformation promotion which is positioned in the vicinity of the third deformation promotion portion and promotes the bending/deforming of the apron reinforcement.

When the load transmission portion transmits the tensional load from the front side frame to the apron reinforcement, the third deformation promotion portion bends and deforms a portion of the apron reinforcement which is positioned in front of the suspension housing inwardly, in the vehicle width direction. Herein, the fourth deformation promotion portion of the load transmission portion promotes the deformation of the apron reinforcement. The apron reinforcement can contribute to the energy absorption by its moving inwardly, in the vehicle width direction, and downwardly.

In another embodiment of the above-described present invention, the apron reinforcement has a third deformation promotion portion to bend and deform the apron reinforcement inwardly, in the vehicle width direction, in a case where the collision load is applied to the vehicle from the vehicle front side, the load transmission portion has a joint portion which is fixed to the apron reinforcement and a second notch which is located at a position of the joint portion which corresponds to the third deformation promotion portion and is not fixed to the apron reinforcement, and the first notch and the second notch are located at respective positions where the first and second notches overlap each other in the vehicle longitudinal direction.

The second notch does not restrict the apron reinforcement. The second notch does not hinder the apron reinforcement from being bent and deformed at the third deformation promotion.

Further, since the first notch and the second notch are located at the respective positions where these overlap each other in the vehicle longitudinal direction, a bending position of the front side frame and a bending position of the apron reinforcement correspond to each other. According to deforming of the front side frame, the apron reinforcement is easily deformed via the load transmission portion.

In another embodiment of the above-described present invention, the load transmission portion has a plate-shaped body which interconnects the suspension housing, the front side frame, and the apron reinforcement.

The above-described plate-shaped body has high rigidity against the load applied in a surface direction. The load transmission portion with the plate-shaped body can efficiently transmit the tension load between the front side frame and the apron reinforcement. Further, since the plate-shaped body is connected to the suspension housing, the load transmission portion can efficiently transmit the collision load to the suspension housing.

The front vehicle-body structure of the vehicle according to a second aspect of the present invention comprises a front side frame extending in a vehicle longitudinal direction in front of a dash panel, an apron reinforcement positioned above and on an outward side, in a vehicle width direction, of the front side frame and extending in the vehicle longitudinal direction, and a suspension housing positioned between the front side frame and the apron reinforcement and fixed to both of the front side frame and the apron reinforcement, wherein the front side frame has a deformation promotion portion to bend and deform the front side frame inwardly, in the vehicle width direction, in a case where a collision load is applied to the vehicle from a vehicle front side, the front vehicle-body structure further comprises a load transmission portion positioned in front of the suspension housing between the front side frame and the apron reinforcement so as to transmit the collision load to the suspension housing, the load transmission portion being provided to connect the front side frame and the apron reinforcement so as to transmit a tensional load applied in the vehicle width direction between the front side frame and the apron reinforcement, and the load transmission portion is configured to deform the apron reinforcement such that the apron reinforcement moves inwardly, in the vehicle width direction, and downwardly by transmitting the tensional load from the bent and deformed front side frame to the apron reinforcement in the case where the collision load is applied to the vehicle from the vehicle front side.

According to the second aspect of the present invention, the load transmission portion deforms the apron reinforcement such that the apron reinforcement moves inwardly, in the vehicle width direction, and downwardly when the front side frame is deformed inwardly, in the vehicle width direction, in the case where the collision load is applied to the vehicle from the vehicle front side. Thereby, the apron reinforcement can hit against the collision object, thereby contributing to the energy absorption.

Thus, the above-described front vehicle-body structure of the vehicle according to the present invention can properly make the apron reinforcement located at the high level contribute to the energy absorption in the collision.

The present invention will become apparent from the following description which refers to the accompanying drawings.

DETAILED DESCRIPTION OF THE INVENTION

Figure 1:
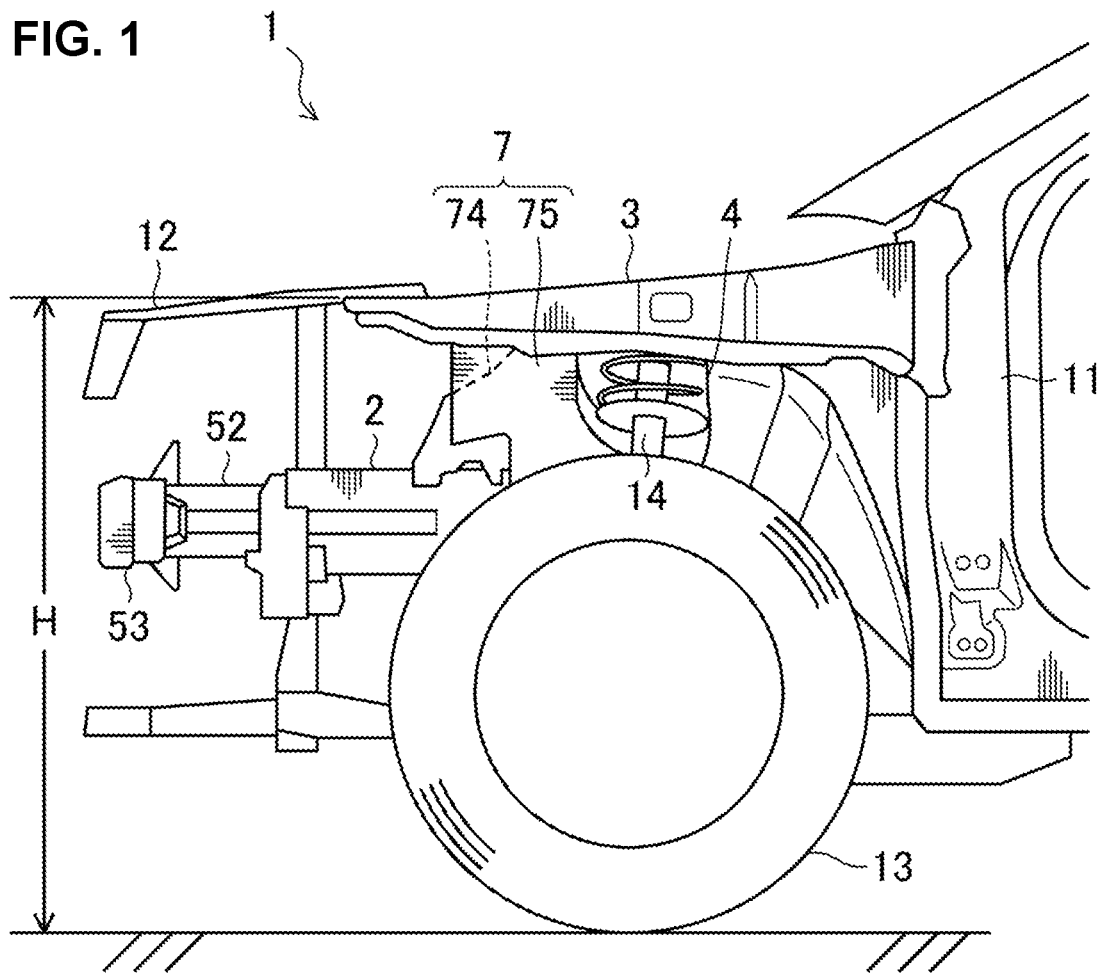
FIG. 1 shows a front vehicle-body structure of a vehicle.
Figure 1:
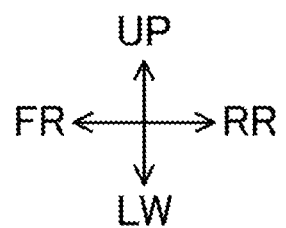

Hereafter, an embodiment of a front vehicle-body structure of a vehicle will be described referring to the drawings. Herein, the following description of the font vehicle-body structure is merely one example of the present invention.
(Whole Structure)

FIG. 1 is a view of a front portion of a vehicle, when viewed from a left side. In the drawings, an arrow FR shows a vehicle front side, an arrow RR shows a vehicle rear side, an arrow OUT shows an outward side, in a vehicle with direction, of the vehicle, an arrow IN shows an inward side, in the vehicle width direction, of the vehicle, an arrow UP shows a vehicle upper side, and an arrow LW shows a vehicle lower side. Herein, since FIGS. 2-5, 8 and 9 show a leftward side part, in the vehicle width direction, of a front vehicle body, the arrow OUT corresponds to the leftward side, in the vehicle width direction, of the vehicle, and the arrow IN corresponds to a rightward side, in the vehicle width direction, of the vehicle.

A front vehicle-body structure 1 is substantially of a laterally symmetrical shape in the vehicle width direction. Hereafter, a structure of the leftward-side part, in the vehicle width direction, of the front vehicle body will be described. A structure of a rightward-side part, in the vehicle width direction, of the front vehicle body is symmetrical to the structure of the leftward-side part.

Figure 2:
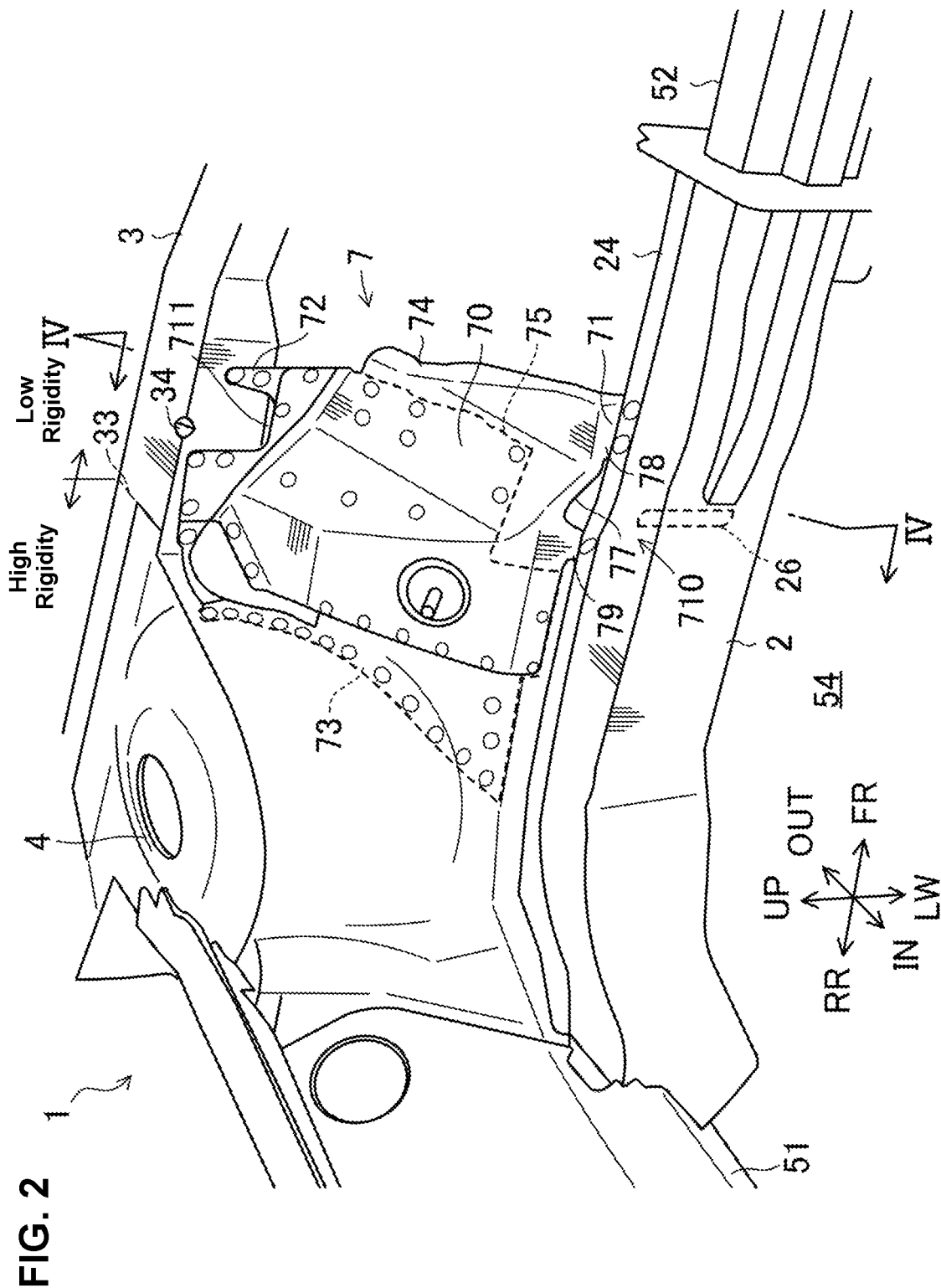
FIG. 2 shows a front side frame, an apron reinforcement, a suspension housing, and a load transmission portion in the front vehicle-body structure.
Figure 3:
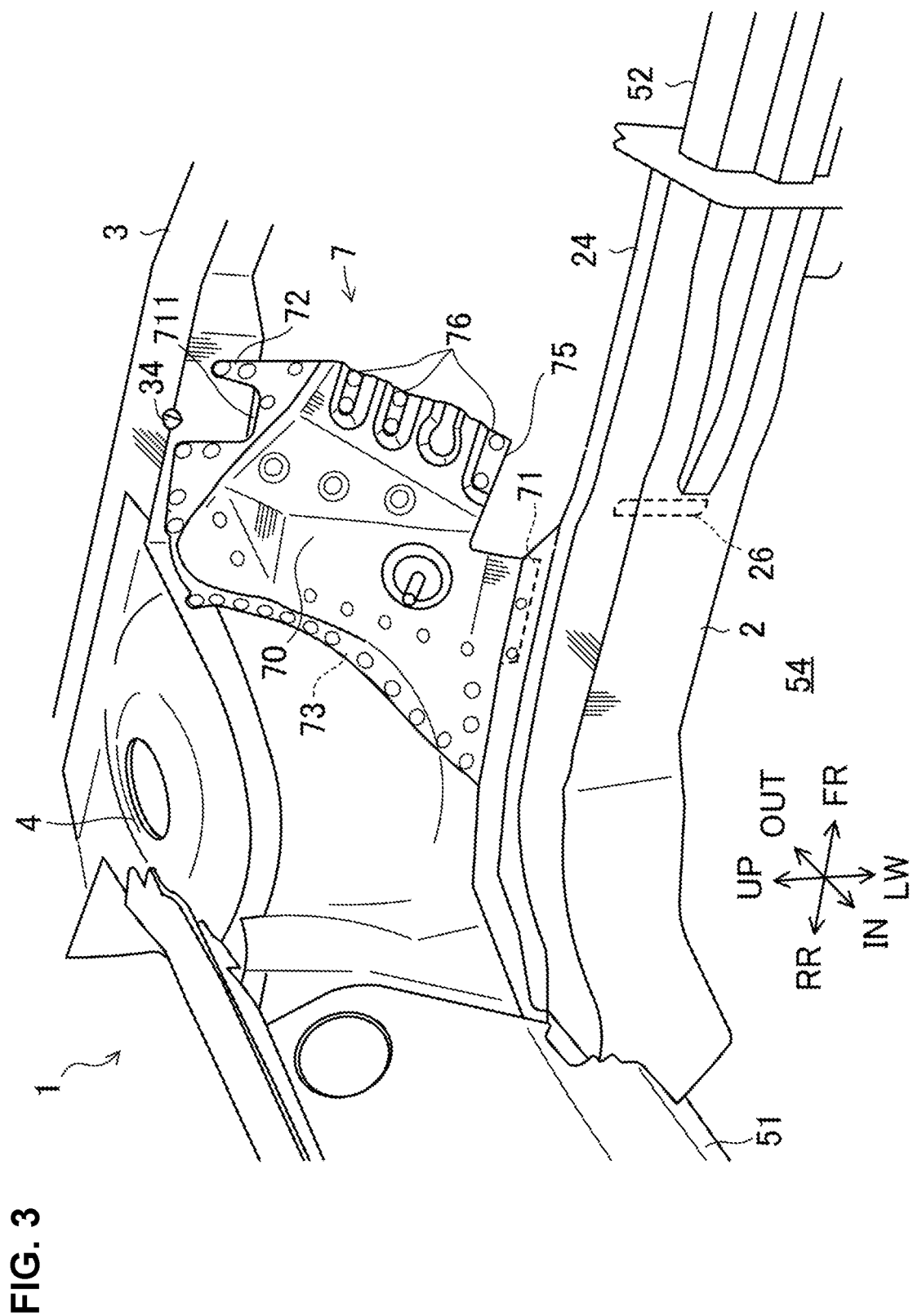
FIG. 3 shows a state where an upper-side plate of the load transmission portion is removed from FIG. 2.

As shown in FIGS. 1-3, the front vehicle-body structure 1 comprises a front side frame 2, an apron reinforcement 3, and a suspension housing 4.

The front side frame 2 extends in a vehicle longitudinal direction in front of a dash panel 51. The front side frame 2 is positioned at each of the rightward-and-leftward sides, in the vehicle width direction, of the front portion of the vehicle. A front end of the front side frame 2 is connected to a bumper beam 53 via a crash can 52. The bumper beam 53 extends in the vehicle width direction at a front end portion of the vehicle.

Figure 4:
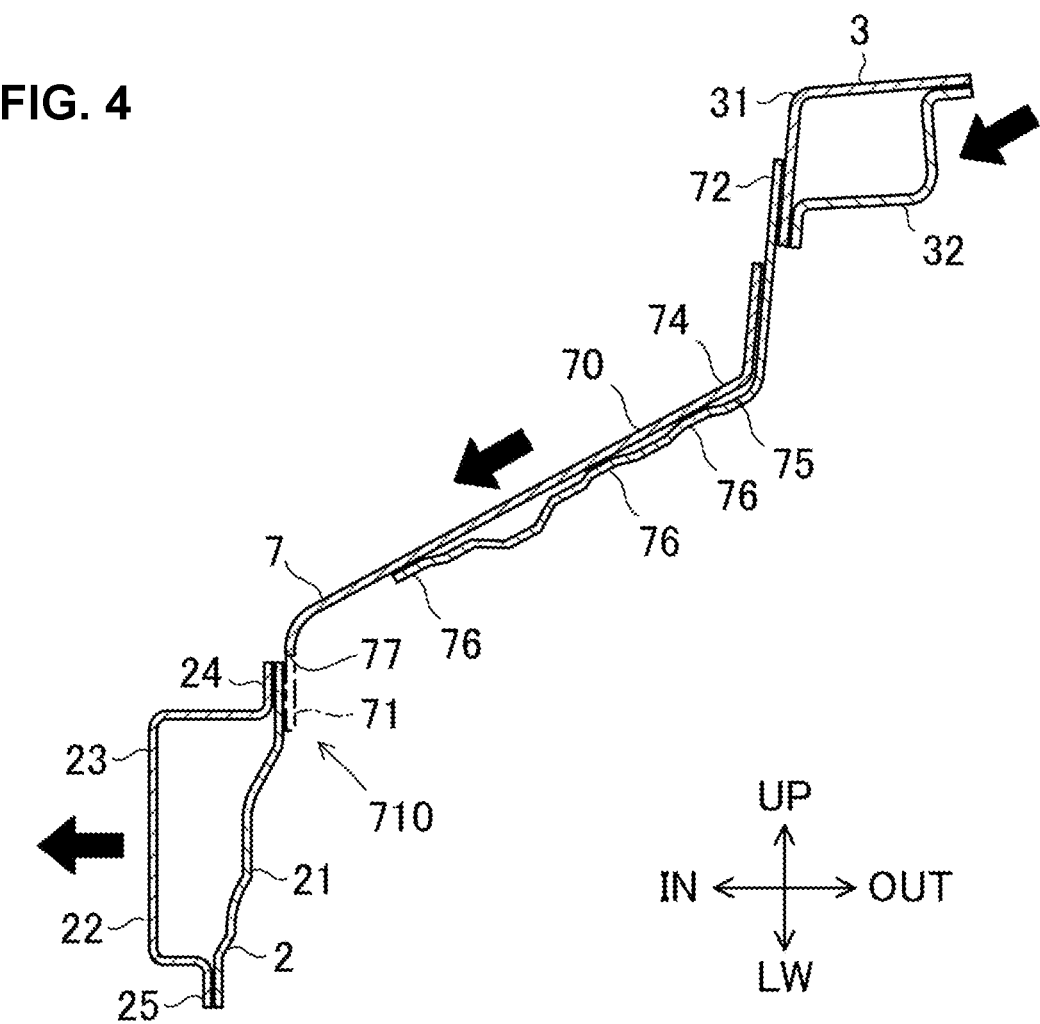
FIG. 4 is a sectional view taken along line IV-IV of FIG. 2.

The front side frame 2 is formed by an outer panel 21 and an inner panel 22 as shown in FIG. 4. The outer panel 21 is a flat-plate shaped steel plate and forms an outward wall, in the vehicle width direction, of the front side frame 2. The inner panel 22 is positioned on the inward side, in the vehicle width direction, of the outer panel 21. The inner panel 22 is a steel plate having a hat-shaped cross section and forms an inward wall, in the vehicle width direction, of front side frame 2. The inner panel 22 and the outer panel 21 are joined together at their upper end portions and their lower end portions. These panels 22, 21 are joined together by spot welding at plural points in the vehicle longitudinal direction, for example. The front side frame 2 comprises a frame body 23 which has a closed-cross section, an upper flange 24 which is positioned above the frame body 23, and a lower flange 25 which is positioned below the frame body 23.

Herein, the crash can 52 is a metal-made cylindrical body with a cylinder center extending in the vehicle width direction. A cross section of the crash can 52 which perpendicularly crosses the vehicle longitudinal direction is substantially of a cross shape. This crash can 52 is compressively deformed in a bellows shape in its axial direction when a collision load is applied to the vehicle in a collision of the vehicle, thereby absorbing the collision load.

The dash panel 51 partitions an power-unit room 54 from a cabin. An engine and an electric motor are disposed between the left-side front side frame 2 and a right-side front side frame of the power-unit room 54. The front side frame 2 supports the engine and the electric motor. The vehicle is an electromotive vehicle, specifically the PHEV. A battery for traveling which is installed to the vehicle is positioned below a floor of the cabin.

The apron reinforcement 3 is positioned above and on the outward side, in the vehicle width direction, of the front side frame 2. Since the battery is provided below the floor, the apron reinforcement 3 is located at a relatively high level (see H in FIG. 1).

The apron reinforcement 3 is positioned at each of the rightward-and-leftward sides, in the vehicle width direction, of the front portion of the electromotive vehicle. The apron reinforcement 3 extends in the vehicle longitudinal direction. A rear end of the apron reinforcement 3 is connected to an upper end portion of a hinge pillar 11. A front end of the apron reinforcement 3 is connected to a shroud upper 12. The shroud upper 12 extends in the vehicle width direction. The shroud upper 12 interconnects respective front ends of the right-and-left apron reinforcements 3. As shown in FIG. 1, the front end of the apron reinforcement 3 is located substantially at the same position, in the longitudinal direction, as a joint portion of the front side frame 2 and the crash can 52 or in back of this joint portion.

As shown in FIG. 4, the apron reinforcement 3 is formed by a first member 31 and a second member 32. The first member 31 is a steel plate which has an L-shaped cross section and forms an upper wall and an inward wall, in the vehicle width direction, of the apron reinforcement 3. The second member 32 is also a steel plate having the L-shaped cross section and forms a lower wall and an outward wall, in the vehicle width direction, of the apron reinforcement 3. The second member 32 is positioned below the first member 31. The first member 31 and the second member 32 are joined together at their right-end portions and left-end portions. The apron reinforcement 3 has a closed-cross section.

As shown in FIGS. 2 and 3, the suspension housing 4 is positioned between the front side frame 2 and the apron reinforcement 3. The suspension housing 4 is fixed to both of the front side frame 2 and the apron reinforcement 3. The suspension housing 4 has a roughly-cylindrical portion with a cylinder axis extending in a vertical direction and supports an upper end of a suspension damper 14 of a front wheel 13. The suspension housing 4 has high rigidity.

The apron reinforcement 3 extends forwardly through the outward side, in the vehicle width direction, of the suspension housing 4. As shown in FIG. 2, when a portion of the apron reinforcement 3 where the suspension housing 4 is joined and a front portion of the apron reinforcement 3 which is positioned in front of the suspension housing 4 are compared regarding the rigidity, the portion where the suspension housing 4 is joined has the relatively high rigidity and the front portion in front of the suspension housing 4 has the relatively low rigidity. Thus, the apron reinforcement 3 has a rigidity difference with its difference border positioned at a specified point, in the longitudinal direction, thereof (see a border 33).

(Structure of Load Transmission Portion)

The front vehicle-body structure 1 comprises a load transmission portion 7. The load transmission portion 7 has the function of moving the apron reinforcement 3 according to deformation of the front side frame 2 in the collision of the vehicle. As described above, since the apron reinforcement 3 of the electromotive vehicle is located at the relatively high level, there is a possibility that the apron reinforcement 3 does not hit against a collision object. However, the above-described moving function can make the apron reinforcement 3 hit against the collision object, thereby contributing to the energy absorption properly. This front vehicle-body structure 1 makes the apron reinforcement 3 contribute to the energy absorption by utilizing the deformation of the front side frame 2, so that there is a merit that any other structure for the energy absorption, in place of the apron reinforcement 3, is unnecessary.

The load transmission portion 7 is positioned in front of the suspension housing 4 between the front side frame 2 and the apron reinforcement 3. The load transmission portion 7 is located at respective central positions, in the longitudinal direction, of the front side frame 2 and the apron reinforcement 3.

The load transmission portion 7 is joined to the suspension housing 4. The load transmission portion 7 can transmit the collision load to the suspension housing 4 in the collision. The load transmission portion 7 further connects the front side frame 2 and the apron reinforcement 3 in the vehicle width direction. The load transmission portion 7 transmits a tensional load between the front side frame 2 and the apron reinforcement 3.

Hereafter, the structure of the load transmission portion 7 will be described specifically referring to the drawings. As shown in FIGS. 2 and 4, the load transmission portion 7 comprises a plate-shaped body 70, a first joint portion 71, a second joint portion 72, and a third joint portion 73.

The plate-shaped body 70 is positioned among the suspension housing 4, the front side frame 2, and the apron reinforcement 3. The plate-shaped body 70 expands in the vehicle width direction such that it extends between the front side frame 2 and the apron reinforcement 3. The plate-shaped body 70 further expands in the longitudinal direction, and its rear end portion contacts the suspension housing 4. The front side frame 2 is located at a relatively low level, and the apron reinforcement 3 is located at a relatively high level. Accordingly, the plate-shaped body 70 is inclined such that an inward side, in the vehicle width direction, thereof is low and an outward side, in the vehicle width direction, thereof is high. The plate-shaped body 70 is also inclined such that a forward side, in the longitudinal direction, thereof is low and a rearward side, in the longitudinal direction, thereof is high.

The first joint portion 71 joins the plate-shaped body 70 to the front side frame 2. The first joint portion 71 joins the plate-shaped body 70 to a central portion, in the longitudinal direction, of the front side frame 2. The first joint portion 71 is formed by an edge portion of an inward side, in the vehicle width direction, of the load transmission portion 7 which is bent downwardly. The first joint portion 71 and the front side frame 2 are joined together by the spot welding, for example. More specifically, the first joint portion 71 is joined to the upper flange 24 of the front side frame 2 in a state where it overlaps with the upper flange 24 in the vehicle width direction. Herein, a circular mark in FIGS. 2 and 3 shows a spot-welding point.

The second joint portion 72 joins the plate-shaped body 70 to the apron reinforcement 3. The second joint portion 72 joins the plate-shaped body 70 to a central portion, in the longitudinal direction, of the apron reinforcement 3. The second joint portion 72 is formed by an edge portion of an outward side, in the vehicle width direction, of the load transmission portion 7 which is bent upwardly. The second joint portion 72 and the apron reinforcement 3 are joined together by the spot welding, for example. More specifically, the second joint portion 72 is joined to an inward wall, in the vehicle width direction, of the apron reinforcement 3 in a state where it overlaps with the above-described inward wall of the apron reinforcement 3 in the vehicle width direction.

The third joint portion 73 joins an rear edge portion of the plate-shaped body 70 to the suspension housing 4. The third joint portion 73 joins the plate-shaped body 70 to a peripheral face of the roughly cylindrical-shaped suspension housing 4. More precisely, as shown in the lower part of FIG. 5, the third joint portion 73 is joined to a peripheral face of an outward side, in the vehicle width direction, of the suspension housing 4 in a state where it overlaps with the above-described peripheral face of the outward side of the suspension housing 4.

The load transmission portion 7 is formed by an upper-side plate 74 and a lower-side plate 75. The lower-side plate 75 is positioned below the upper-side plate 74. The upper-side plate 74 and the lower-side plate 75 partially overlap each other in a vertical direction. The plate-shaped body 70 is formed by an overlapping point of the upper-side plate 74 and the lower-side plate 75.

The upper-side plate 74 constitutes the plate-shaped body 70 and the first joint portion 71. As shown in FIG. 3, the lower-side plate 75 constitutes the plate-shaped body 70, part of the first joint portion 71, the second joint portion 72, and the third joint portion 73. The upper-side plate 74 and the lower-side plate 75 are joined together by the spot welding, for example.

Herein, plural beads 76 are formed at a front end portion of the lower-side plate 75. The plural beads 76 are provided in a row in the vehicle width direction. Each of the beads 76 is configured to be upwardly convex. The plate-shaped body 70 of the load transmission portion 7 is configured to have a closed-cross section structure as shown in FIG. 4 by forming the beads 76. A closed-cross section between the upper-side plate 74 and the lower-side plate 75 extends in the longitudinal direction.

Figure 5:
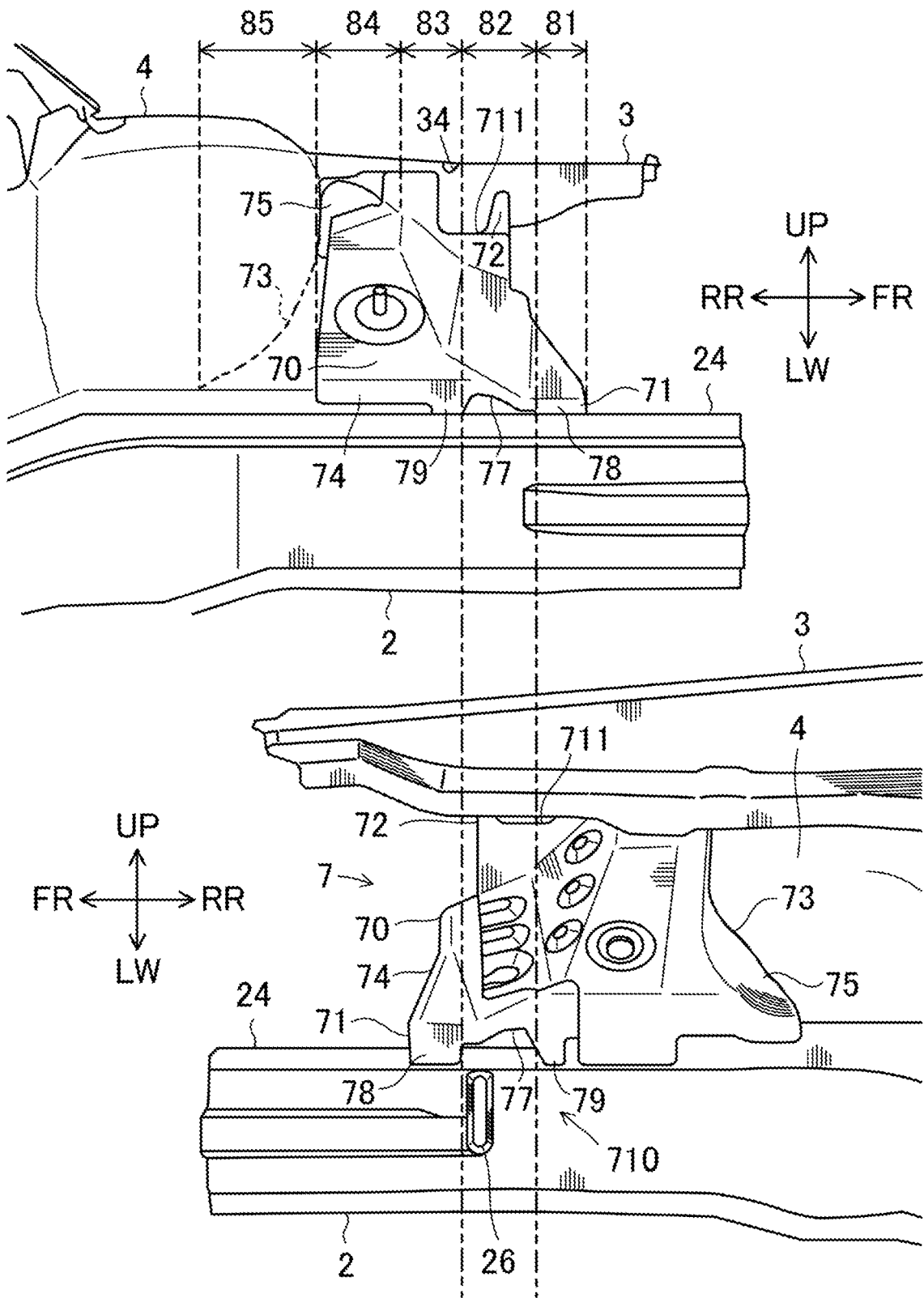
FIG. 5 is a side view, wherein an upper part thereof shows a position of the load transmission portion, when viewed from an inward side, in a vehicle width direction, and a lower part thereof shows the position of the load transmission portion, when viewed from an outward side, in the vehicle width direction.

The first joint portion 71 has a first notch 77. As shown in FIGS. 2, 4 and 5, the first notch 77 is configured such that it is opened downwardly at the first joint portion 71 which overlaps with the upper flange 24 of the front side frame 2, more precisely, at an edge portion of the upper-side plate 74. The first notch 77 does not overlap with the upper flange 24. The first notch 77 has a non-fixation portion which is not fixed to the front side frame 2 at the first joint portion 71.

The first joint portion 71 further has a first fixation portion 78 and a second fixation portion 79. The first fixation portion 78 is fixed to the upper flange 24 in front of the first notch 77. The second fixation portion 79 is fixed to the upper flange 24 in back of the first notch 7. The first notch 77 is positioned between the first fixation portion 78 and the second fixation portion 79.

Herein, the front side frame 2 has a first deformation promotion portion 26. This first deformation promotion portion 26 is a bead which is provided at the outer panel 21 of the front side frame 2 as shown in the lower part of FIG. 5. The bead is configured to be recessed from the outer panel 21 and extend in the vertical direction. The first deformation promotion portion 26 bends and deforms the front side frame 2 inwardly, in the vehicle width direction, in the collision, which will be described later.

As shown in FIG. 2, the longitudinal position of the first notch 77 of the load transmission portion 7 and the longitudinal position of the first deformation promotion portion 26 of the front side frame 2 correspond to each other. Since the first notch 77 is not joined to the front side frame 2, this first notch 77 does not restrict a point of the front side frame 2 which is going to be bent and deformed. Thus, the first notch 77 does not hinder bending/deforming of the front side frame 2 but has the function of promoting its bending/deforming. A second deformation promotion portion 710 which is positioned in the vicinity of the first deformation promotion portion 26 and promotes the bending/deforming of the front side frame 2 is constituted by the first notch 77, the first fixation portion 78, and the second fixation portion 79.

The second joint portion 72 has a second notch 711. As shown in FIGS. 2, 4 and 5, the second notch 711 is configured such that it is opened upwardly at the second joint portion 72 which overlaps with the inward wall of the apron reinforcement 3, more precisely, at an edge portion of the lower-side plate 75. The second notch 711 has a non-fixation portion which is not fixed to the apron reinforcement at the second joint portion 72.

Herein, the apron reinforcement 3 has a third deformation promotion portion 34. This third deformation promotion portion 34 is a recess portion which is provided at an upper-side ridgeline of the inward side, in the vehicle width direction, of the apron reinforcement 3. This recess portion divides the ridgeline. The third deformation promotion portion 34 is positioned in front of the suspension housing 4. More specifically, the third deformation promotion portion 34 is positioned in the vicinity of the border 33 where the rigidity of the apron reinforcement 3 changes as described above. The third deformation promotion portion 34 promotes that the apron reinforcement 3 is bent and deformed inwardly, in the vehicle width direction, which will be described later.

The longitudinal position of the second notch 711 of the load transmission portion 7 and the longitudinal position of the third deformation promotion portion 34 of the apron reinforcement 3 correspond to each other. Since the second notch 711 is not joined to the apron reinforcement 3, this second notch 711 does not restrict a point of the apron reinforcement 3 which is going to be bent and deformed. Thus, the second notch 711 does not hinder bending/deforming of the apron reinforcement 3 but has the function of promoting its bending/deforming. The second notch 711 is an exemplified fourth deformation promotion portion to promote the bending/deforming of the apron reinforcement 3.

Herein, a positional relationship of the plural deformation promotion portions will be described further referring to FIG. 5. The load transmission portion 7 can be divided into a first area 81, a second area 82, a third area 83, a fourth area 84, and a fifth area 85 from its forward side to its rearward side.

The first area 81 is a front end portion of the load transmission portion 7 which is constituted by the upper-side plate 74 only. The second area 82, the third area 83, and the fourth area 84 are portions which are constituted by the upper-side plate 74 and the lower-side plate 75, and correspond to the plate-shaped body 70 having the closed-cross section. The plate-shaped body 70 is formed by combining plural flat faces. The second area 82, the third area 83, and the fourth area 84 have respective different inclination angles of the flat faces forming the plate-shaped body 70. The flat face of the second area 82 has the relatively-small inclination angle which is directed toward the rearward side from the forward side, and the flat face of the third area 83 has the relatively-large inclination angle which is directed toward the rearward side from the forward side, in the longitudinal direction. The flat face of the fourth area 84 has the relatively-large inclination angle which is directed toward the outward side from the inward side, in the vehicle width direction.

The fifth area 85 is a rear end portion of the load transmission portion 7 which is constituted by the lower-side plate 75 only. The fifth area 85 corresponds to the third joint portion 73 which is joined to the suspension housing 4.

The first joint portion 71 of the load transmission portion 7 expands over a range of the first area 81, the second area 82, the third area 83, and the fourth area 84. The second joint portion 72 expands over a range of the second area 82, the third area 83, and the fourth area 84.

The second deformation promotion portion 710 expands over a range of the first area 81, the second area 82, and the third area 83. As described above, the first deformation promotion portion 26 and the first notch 77 are located at respective positions which correspond to each other in the longitudinal direction. The first deformation promotion portion 26 is the central portion, in the longitudinal direction, of the front side frame 2, which is located at a position corresponding to the second area 82 of the load transmission portion 7. The first notch 77 is positioned at the second area 82 of the load transmission portion 7 as well.

The second notch 711 as the fourth deformation promotion portion straddles the second area 82 and the third area 83. Accordingly, the first notch 77 and the second notch 711 are located at the positions which overlap each other in the longitudinal direction.

The third deformation promotion portion 34 and the second notch 711 are located at longitudinal positions which correspond to each other. The third deformation promotion portion 34 is the central portion, in the longitudinal direction, of the apron reinforcement 3, which is located at a position corresponding to the third area 83 of the load transmission portion 7.

Herein, the load transmission portion 7 is not limited to the above-described structure in which the load transmission portion 7 is divided into the first area 81, the second area 82, the third area 83, the fourth area 84, and the fifth area 85. Further, the plate-shaped body 70 is not necessarily formed by combination of the plural flat faces.

(Moves in Collision)

Next, moves of the front vehicle-body structure 1 in the collision will be described referring to FIGS. 6-9. FIGS. 6-9 exemplify simulation results in a case where the front portion of the electromotive vehicle hits against a honeycomb barrier 6 which is used for a collision test. This collision test is an offset collision test (ODB: Offset Deformable Barrier). Herein, the following effects which are obtained by the above-described front vehicle-body structure 1 are not limited to an offset collision of the vehicle, but obtained in a general collision of the front portion of the electromotive vehicle, including a full-lap frontal collision of the vehicle as well.

Figure 6:
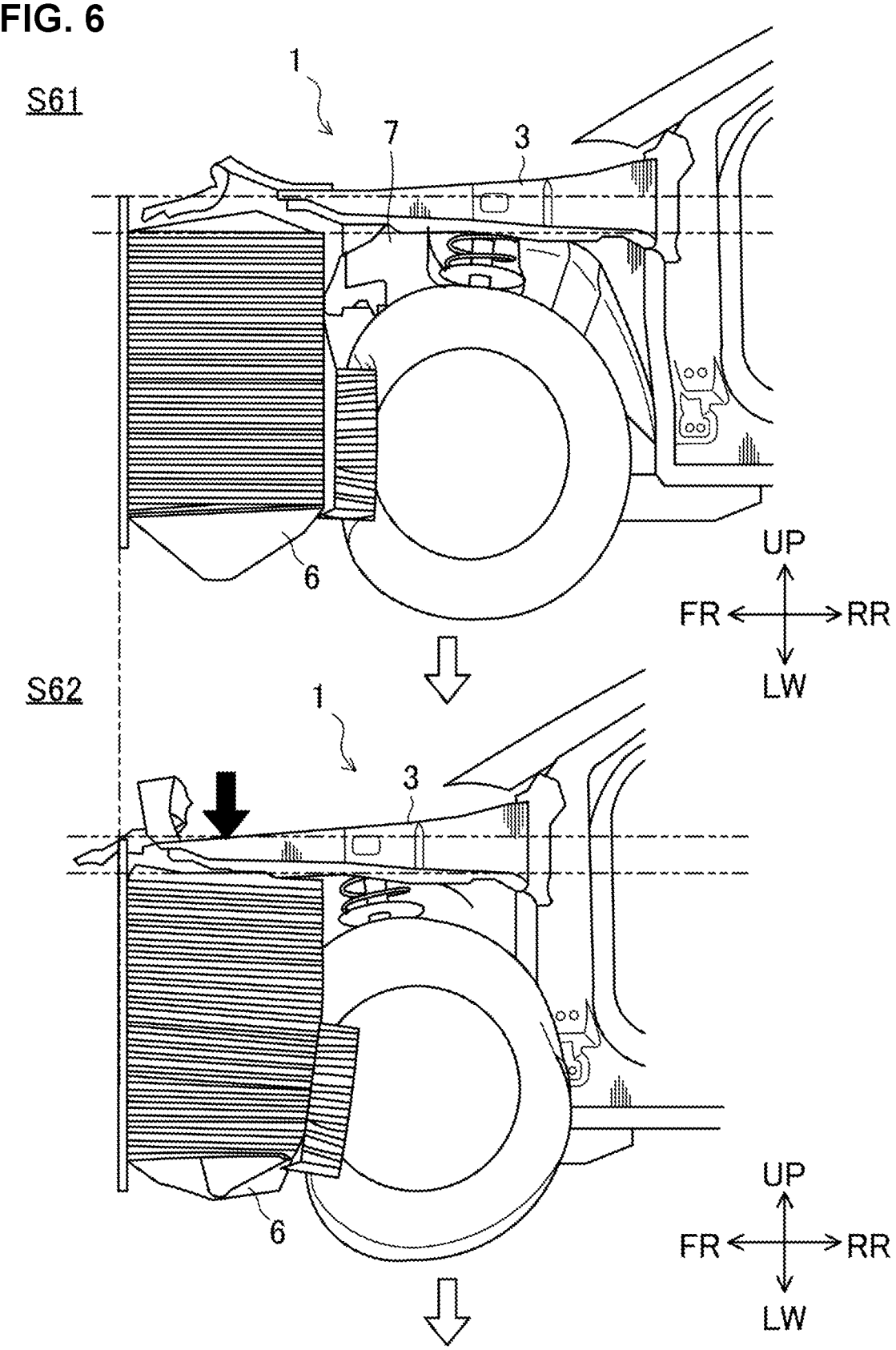
FIG. 6 shows the front vehicle-body structure in the collision, when viewed from a side.
Figure 7:
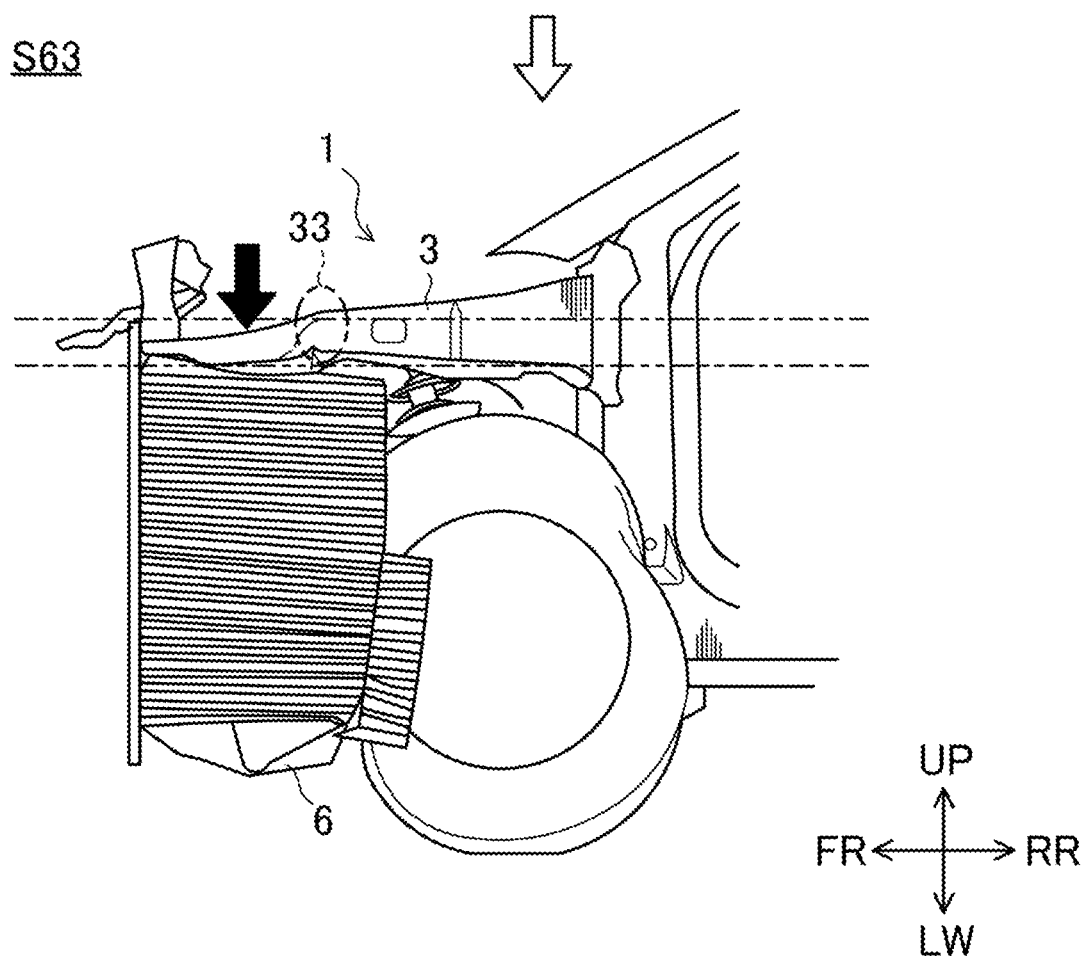
FIG. 7 shows the front vehicle-body structure in the collision, when viewed from the side.

FIG. 1 shows the front portion of the electromotive vehicle in a state before the collision. In FIGS. 6 and 7, a collision process timely proceeds in order of steps S61, S62, and S63. Likewise, in FIGS. 8 and 9, the collision timely process proceeds in order of steps S81, S82, S83, and S84. Herein, the steps of S61, S62, S63 and the steps of S81, S82, S83, S84 do not necessarily show the corresponding time.

As described above, since the battery is provided below the floor in the electromotive vehicle, the position of the apron reinforcement 3 is relatively high. As shown in FIG. 1 or 6, the apron reinforcement 3 in a state before the collision is located at the same level as an upper end of the honeycomb barrier 6 or at a higher level than the upper end of the honeycomb barrier 6. In this state, the apron reinforcement 3 does not hit against the honeycomb barrier 6.

Figure 8:
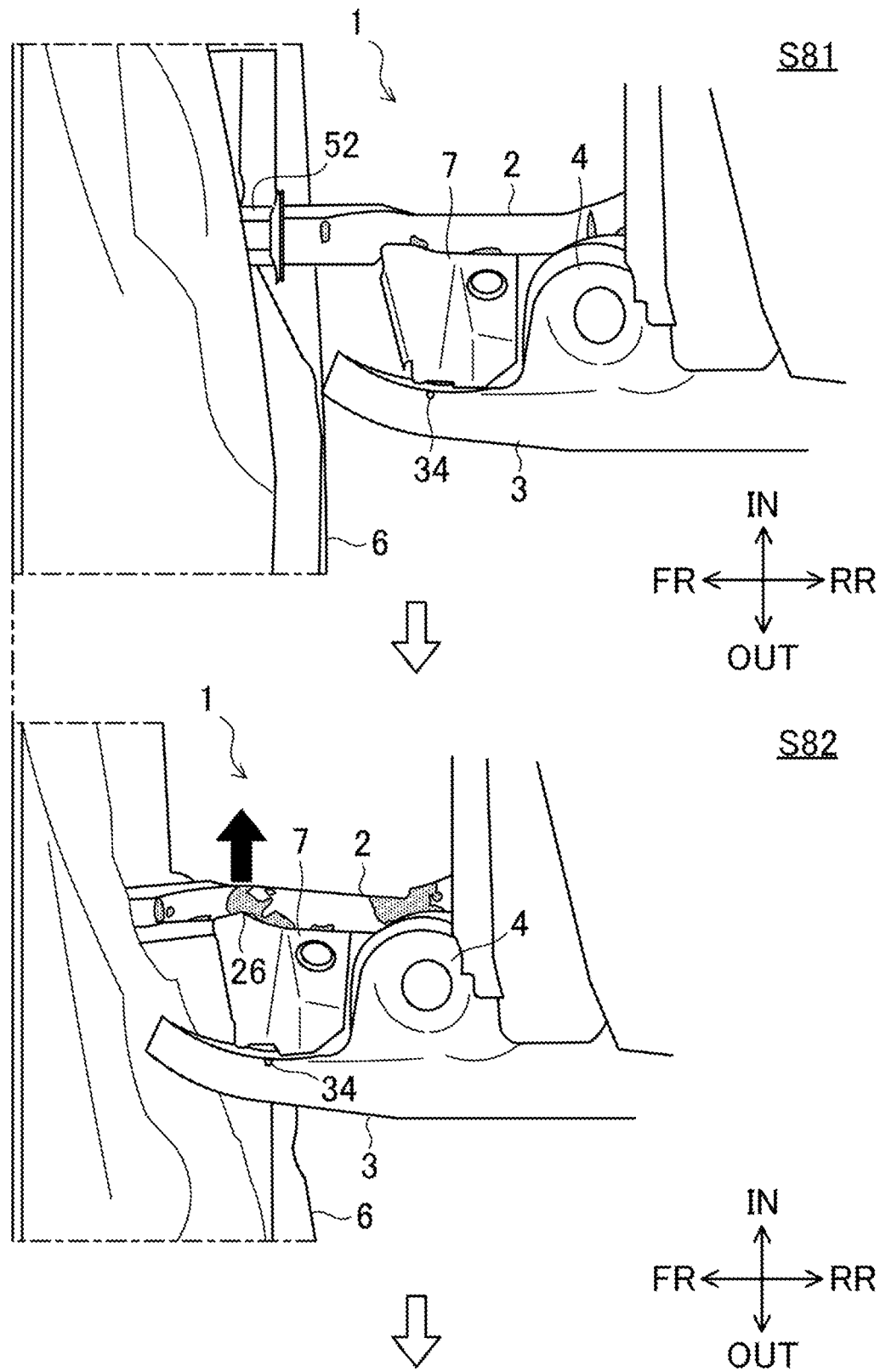
FIG. 8 shows the front vehicle-body structure in the collision, when viewed from an upper side.

As shown in S81 of FIG. 8, when the front portion of the electromotive vehicle hits against the honeycomb barrier 6, the collision load is applied to the front side frame 2 via the crash can 52. As shown by a black arrow in S82, the front side frame 2 starts to be bent and deformed inwardly, in the vehicle width direction, at the first deformation promotion portion 26. The load transmission portion 7 does not hinder the bending/deforming of front side frame 2. Herein, a gray region illustrated in FIGS. 8 and 9 shows an area where a high stress is generated in the front structure of the vehicle.

Figure 9:
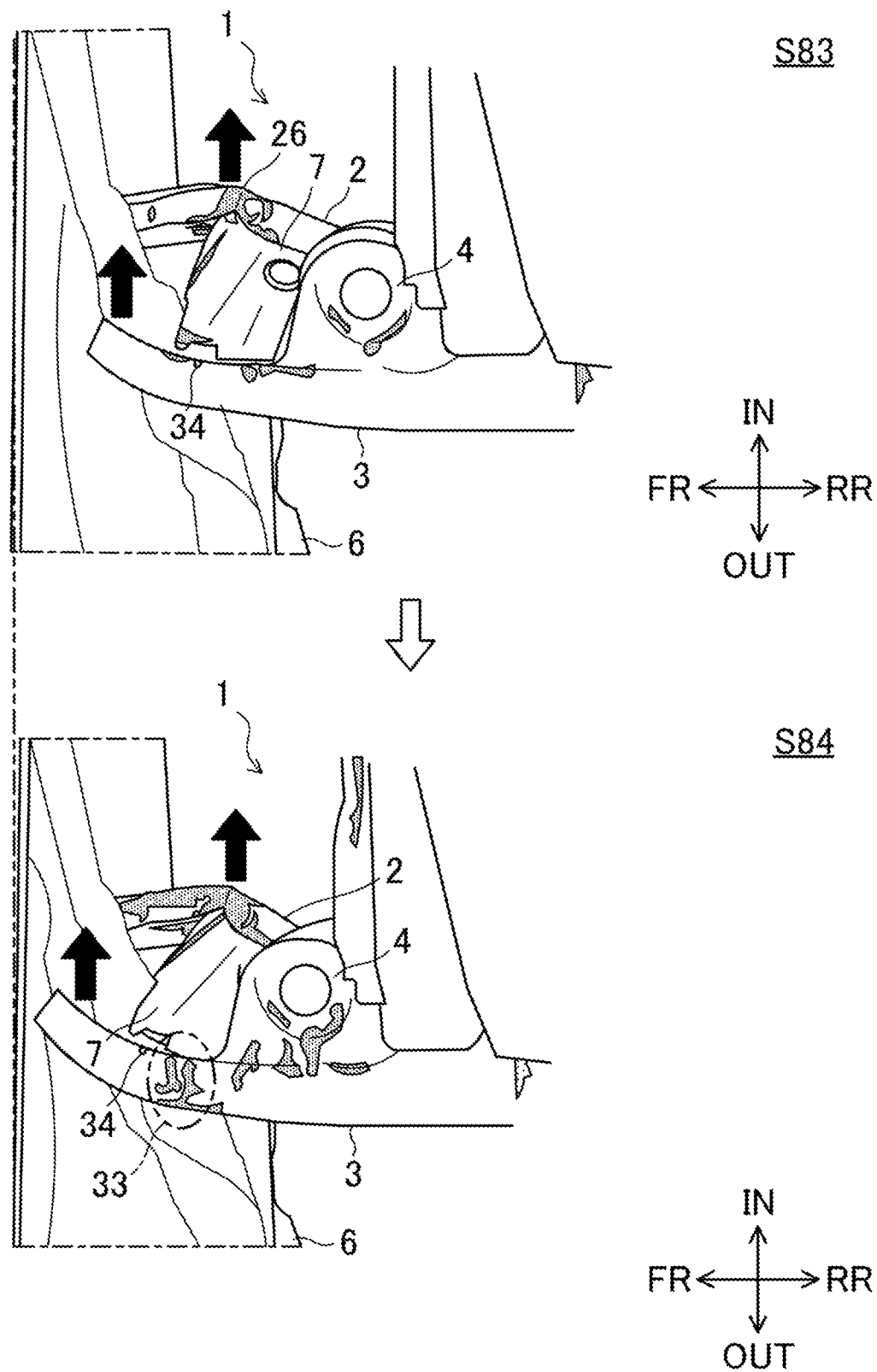
FIG. 9 shows the front vehicle-body structure in the collision, when viewed from the upper side.

As shown in S83 of FIG. 9, when the first deformation promotion portion 26 of the front side frame 2 is further bent and deformed inwardly, in the vehicle width direction, the load transmission portion 7 transmits the tensional load from the front side frame 2 to the apron reinforcement 3. The apron reinforcement 3 is drawn inwardly, in the vehicle width direction, so that the apron reinforcement 3 is bent and deformed at the third deformation promotion portion 34. The front end portion of the apron reinforcement 3 moves inwardly, in the vehicle width direction, as shown in S83 and S84 of FIG. 9 (see black arrows in FIG. 9).

Further, the load transmission portion 7 is inclined relative to the vertical direction between the front side frame 2 and the apron reinforcement 3. The load transmission portion 7 draws the apron reinforcement 3 downwardly as well according to the inward bending/deforming of the front side frame 2 (see black arrows in FIG. 4).

Since the apron reinforcement 3 has the rigidity difference at the border 33 which is positioned in back of the load transmission portion 7, the vertical-directional bending is generated at this border 33. As shown by a black arrow in FIGS. 6 and 7, a front part of the apron reinforcement 3 which is positioned in front of the suspension housing 4 moves downwardly with application of its own weight as well.

Thus, since the apron reinforcement 3 moves inwardly, in the vehicle width direction, and downwardly, the apron reinforcement 3 hits against the honeycomb barrier 6 as shown in FIGS. 7 and 9. Thereby, the apron reinforcement 3 can contribute to the energy absorption in the collision.

(Features of Front Vehicle-Body Structure)

The above-described front vehicle-body structure 1 of the vehicle comprises the front side frame 2 extending in the vehicle longitudinal direction in front of the dash panel 51, the apron reinforcement 3 positioned above and on the outward side, in the vehicle width direction, of the front side frame 2 and extending in the vehicle longitudinal direction, and the suspension housing 4 positioned between the front side frame 2 and the apron reinforcement 3 and fixed to both of the front side frame 2 and the apron reinforcement 3, wherein the front side frame 2 has the first deformation promotion portion 26 to bend and deform the front side frame 2 inwardly, in the vehicle width direction, in the case where the collision load is applied to the vehicle from the vehicle front side, the front vehicle-body structure 1 further comprises the load transmission portion 7 positioned in front of the suspension housing 4 between the front side frame 2 and the apron reinforcement 3 so as to transmit the collision load to the suspension housing 4, the load transmission portion 7 being provided to connect the front side frame 2 and the apron reinforcement 3 so as to transmit the tensional load applied in the vehicle width direction between the front side frame 2 and the apron reinforcement 3, and the load transmission portion 7 has the second deformation promotion portion 710 which is positioned in the vicinity of the first deformation promotion portion 26 and promote the bending/deforming of the front side frame 2.

According to this structure, the load transmission portion 7 draws the apron reinforcement 3 toward the front side frame 2 when the front side frame 2 is deformed inwardly, in the vehicle width direction. The apron reinforcement 3 is deformed such that it moves inwardly, in the vehicle width direction, and downwardly. Since the level of the apron reinforcement 3 becomes lower, the apron reinforcement 3 comes to hit against the collision object, such as the honeycomb barrier 6. Thereby, the apron reinforcement 3 can contribute to the energy absorption in the collision.

In the present front vehicle-body structure 1, since the apron reinforcement 3 is made to contribute to the energy absorption by utilizing the deformation of the front side frame 2, any other structure for the energy absorption, in place of the apron reinforcement 3, is unnecessary. Thus, the present front vehicle-body structure 1 is useful in reducing the vehicle weight.

Further, the second deformation promotion portion 710 promotes the deformation of the front side frame 2. Since the second deformation promotion portion 710 does not hinder the deformation of the front side frame 2, moving of the apron reinforcement 3 is not hindered.

Moreover, the load transmission portion 7 transmits the collision load applied to the vehicle from the vehicle front side to the suspension housing 4. It is suppressed that the load transmission portion 7 is deformed and/or broken by the collision load. The load transmission portion 7 can transmit the tensional load from the front side frame 2 to the apron reinforcement 3 in the collision.

The second deformation promotion portion 710 includes the first fixation portion 78 which is fixed to the front side frame 2 in front of the first deformation promotion portion 26, the second fixation portion 79 which is fixed to the front side frame 2 in back of the first deformation promotion portion 26, and the non-fixation portion which is positioned between the first fixation portion 78 and the second fixation portion 79 and not fixed to the front side frame 2.

Since the load transmission portion 7 does not restrict the first deformation promotion portion 26, the bending/deforming of the front side frame 2 is not hindered. The first deformation promotion portion 26 can promote the bending/deforming of the front side frame 2.

The load transmission portion 7 has the first joint portion 71 which is joined to the upper flange 24 of the front side frame 2, and the non-fixation portion is the first notch 77 which is formed at the first joint portion 71.

The first notch 77 can promote the bending/deforming of the front side frame 2 with a simple structure.

Herein, the second deformation promotion portion may be a bead which is formed at the load transmission portion 7 in place of the first notch 11. The bead formed at the load transmission portion 7 constitutes a fragile portion to deform the load transmission portion 7 according to the bending/deforming of the front side frame 2. The load transmission portion 7 is deformed and thereby does not hinder the bending/deforming of the front side frame 2 and promotes the bending/deforming of the front side frame 2.

The load transmission portion 7 has the upper-side plate 74 and the lower-side plate 75 which is positioned below the upper-side plate 74. The load transmission portion 7 made of the upper-and-lower two sheets of plates and having the high rigidity can transmit the tensional load applied in the vehicle width direction between the front side frame 2 and the apron reinforcement 3. Further, the load transmission portion 7 having the high rigidity can transmit the collision load to the suspension housing 4.

The upper-side plate 74 and the lower-side plate 75 are joined together, and the load transmission portion 7 has the closed-cross section structure in which the closed-cross section extending in the vehicle longitudinal direction is formed between the upper-side plate 74 and the lower-side plate 75.

In an initial stage of application of the collision load to the load transmission portion 7, the load transmission portion 7 can absorb the energy by its closed-cross section being crushed. The load transmission portion 7 having the closed-cross section structure can contribute to both of the energy absorption and the load transmission.

The apron reinforcement 3 has the third deformation promotion portion 34 to bend and deform the apron reinforcement 3 inwardly, in the vehicle width direction, in front of the suspension housing 4, and the load transmission portion 7 has the second notch 711 as the fourth deformation promotion which is positioned in the vicinity of the third deformation promotion portion 34 and promotes the bending/deforming of the apron reinforcement 3.

When the load transmission portion 7 transmits the tensional load from the front side frame 2 to the apron reinforcement 3, the third deformation promotion portion 34 bends and deforms the apron reinforcement 3 inwardly, in the vehicle width direction. Herein, the second notch 711 of the load transmission portion 7 does not hinder the deformation of the apron reinforcement 3. The apron reinforcement 3 can contribute to the energy absorption by its moving inwardly, in the vehicle width direction, and downwardly.

The apron reinforcement 3 has the third deformation promotion 34 to bend and deform the apron reinforcement 3 inwardly, in the vehicle width direction, in the case where the collision load is applied to the vehicle from the vehicle front side, the load transmission portion 7 has the second notch 711 which is not fixed to the apron reinforcement 3, and the first notch 77 and the second notch 711 are located at the respective positions where the first and second notches 77, 711 overlap each other in the vehicle longitudinal direction.

Since the first notch 77 and the second notch 711 are located at the respective positions where these overlap each other in the vehicle longitudinal direction, a bending position of the front side frame 2 and a bending position of the apron reinforcement 3 correspond to each other. According to deforming of the front side frame 2, the apron reinforcement 3 is easily deformed via the load transmission portion 7.

The load transmission portion 7 has the plate-shaped body 70 which interconnects the suspension housing 4, the front side frame 2, and the apron reinforcement 3.

The plate-shaped body 70 has the high rigidity against the load applied in a surface direction. The load transmission portion 7 can efficiently transmit the tension load between the front side frame 2 and the apron reinforcement 3 and also can efficiently transmit the collision load to the suspension housing 4.

Further, the load transmission portion 7 transmits the tensional load from the bent-and-deformed front side frame 2 to the apron reinforcement 3 in the case where the collision load is applied to the vehicle from the vehicle front side, thereby deforming the apron reinforcement 3 inwardly, in the vehicle width direction, and downwardly.

Likewise, the load transmission portion 7 deforms the apron reinforcement 3 such that the apron reinforcement 3 moves inwardly, in the vehicle width direction, and downwardly when the front side frame 2 is deformed inwardly, in the vehicle width direction, in the case where the collision load is applied to the vehicle from the vehicle front side. Thereby, the apron reinforcement 3 can contribute to the energy absorption.

OTHER EMBODIMENTS

The above-described front vehicle-body structure of the vehicle is applicable not only to the electromotive vehicle but to any vehicle in which the battery is not provided below the floor.

Further, the above-described shape of the load transmission portion 7 is merely one example, and any other shape of the load transmission portion 7 is applicable as long as the load transmission portion 7 has the function of transmitting the tensional load from the front side frame 2 to the apron reinforcement 3.

What is claimed is:

1. A front vehicle-body structure of a vehicle, comprising:
   a front side frame extending in a vehicle longitudinal direction in front of a dash panel;
   an apron reinforcement positioned above and on an outward side, in a vehicle width direction, of the front side frame and extending in the vehicle longitudinal direction; and
   a suspension housing positioned between the front side frame and the apron reinforcement and fixed to both of the front side frame and the apron reinforcement,
   wherein said front side frame has a first deformation promotion portion to bend and deform the front side frame inwardly, in the vehicle width direction, in a case where a collision load is applied to the vehicle from a vehicle front side,
   said front vehicle-body structure further comprises a load transmission portion positioned in front of said suspension housing between said front side frame and said apron reinforcement so as to transmit the collision load to the suspension housing, the load transmission portion being provided to connect the front side frame and the apron reinforcement so as to transmit a tensional load applied in the vehicle width direction between the front side frame and the apron reinforcement,
   said load transmission portion has a second deformation promotion portion which is positioned in the vicinity of said first deformation promotion portion and promote said bending/deforming of the front side frame, and
   said apron reinforcement has a third deformation promotion portion to bend and deform said apron reinforcement inwardly, in the vehicle width direction, in front of said suspension housing, and said load transmission portion has a fourth deformation promotion which is positioned in the vicinity of said third deformation promotion portion and promotes the bending/deforming of said apron reinforcement.

2. The front vehicle-body structure of the vehicle of claim 1, wherein said second deformation promotion portion includes a first fixation portion which is fixed to said front side frame in front of said first deformation promotion portion, a second fixation portion which is fixed to the front side frame in back of the first deformation promotion portion, and a non-fixation portion which is positioned between said first fixation portion and said second fixation portion and not fixed to the front side frame.

3. The front vehicle-body structure of the vehicle of claim 2, wherein said load transmission portion has a first joint portion which is joined to a flange of said front side frame, and said non-fixation portion is a first notch which is formed at said first joint portion.

4. The front vehicle-body structure of the vehicle of claim 1, wherein said load transmission portion has an upper-side plate and a lower-side plate which is positioned below said upper-side plate.

5. The front vehicle-body structure of the vehicle of claim 4, wherein said upper-side plate and said lower-side plate are joined together, and said load transmission portion has a closed-cross section structure in which a closed-cross section extending in the vehicle longitudinal direction is formed between said upper-side plate and said lower-side plate.

6. A front vehicle-body structure of a vehicle, comprising:
   a front side frame extending in a vehicle longitudinal direction in front of a dash panel;
   an apron reinforcement positioned above and on an outward side, in a vehicle width direction, of the front side frame and extending in the vehicle longitudinal direction; and
   a suspension housing positioned between the front side frame and the apron reinforcement and fixed to both of the front side frame and the apron reinforcement,
   wherein said front side frame has a first deformation promotion portion to bend and deform the front side frame inwardly, in the vehicle width direction, in a case where a collision load is applied to the vehicle from a vehicle front side,
   said front vehicle-body structure further comprises a load transmission portion positioned in front of said suspension housing between said front side frame and said apron reinforcement so as to transmit the collision load to the suspension housing, the load transmission portion being provided to connect the front side frame and the apron reinforcement so as to transmit a tensional load applied in the vehicle width direction between the front side frame and the apron reinforcement,
   said load transmission portion has a second deformation promotion portion which is positioned in the vicinity of said first deformation promotion portion and promote said bending/deforming of the front side frame,
   said second deformation promotion portion includes a first fixation portion which is fixed to said front side frame in front of said first deformation promotion portion, a second fixation portion which is fixed to the front side frame in back of the first deformation promotion portion, and a non-fixation portion which is positioned between said first fixation portion and said second fixation portion and not fixed to the front side frame,
   said load transmission portion has a first joint portion which is joined to a flange of said front side frame, and said non-fixation portion is a first notch which is formed at said first joint portion, and
   said apron reinforcement has a third deformation promotion portion to bend and deform said apron reinforcement inwardly, in the vehicle width direction, in a case where the collision load is applied to the vehicle from the vehicle front side, said load transmission portion has a joint portion which is fixed to the apron reinforcement and a second notch which is located at a position of said joint portion which corresponds to said third deformation promotion portion and is not fixed to the apron reinforcement, and said first notch and said second notch are located at respective positions where the first and second notches overlap each other in the vehicle longitudinal direction.

7. The front vehicle-body structure of the vehicle of claim 1, wherein said load transmission portion has a plate-shaped body which interconnects said suspension housing, said front side frame, and said apron reinforcement.

* * * * *